Dec. 12, 1967 H. E. ERIKSON 3,357,331
PHOTOGRAPHIC FILM ASSEMBLY
Filed July 12, 1965. 2 Sheets-Sheet 1

INVENTOR
Herman E. Erikson
BY Brown and Mikulka
and
Charles J. McGuire
ATTORNEYS Dec. 12, 1967   H. E. ERIKSON   3,357,331
PHOTOGRAPHIC FILM ASSEMBLY
Filed July 12, 1965   2 Sheets-Sheet 2
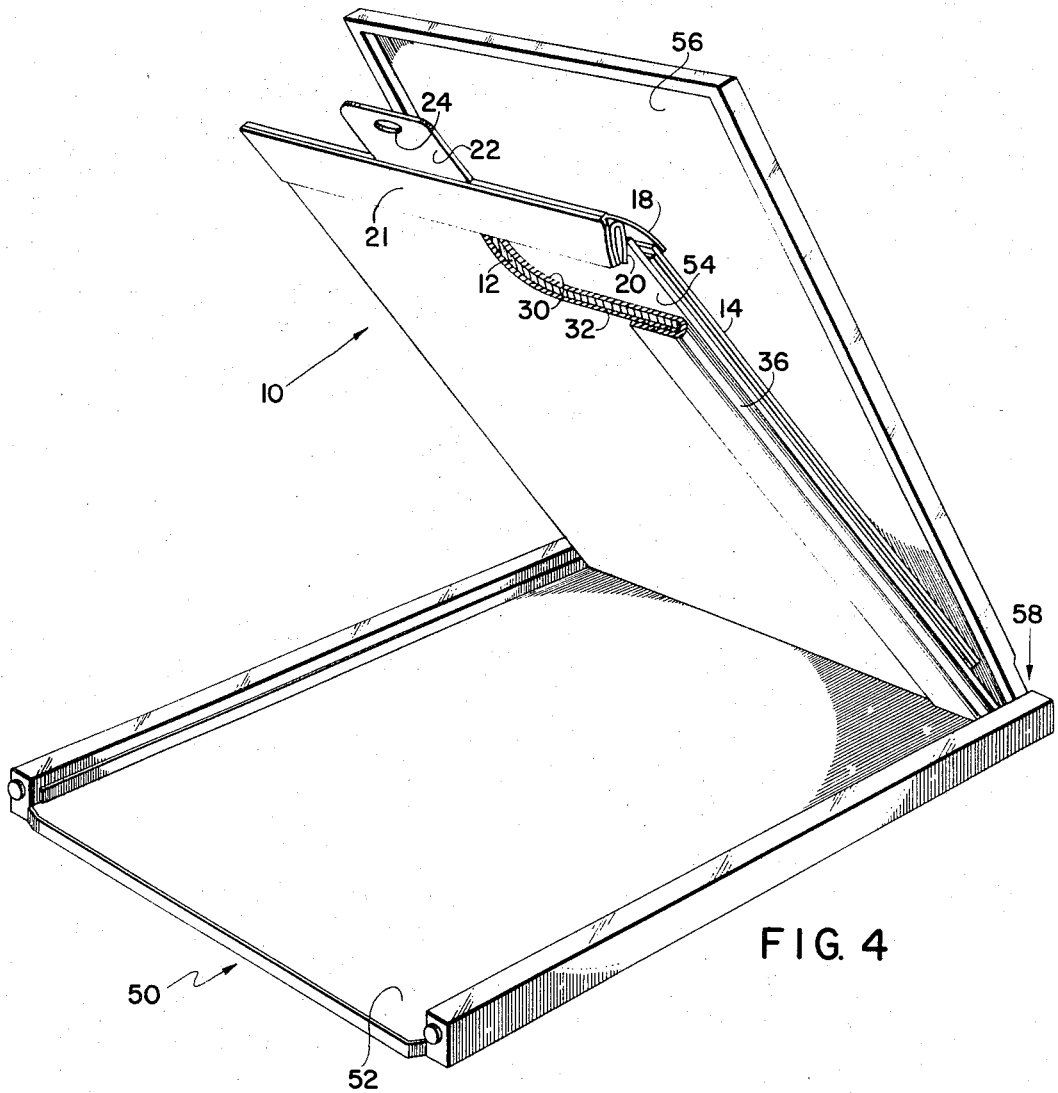
FIG. 4
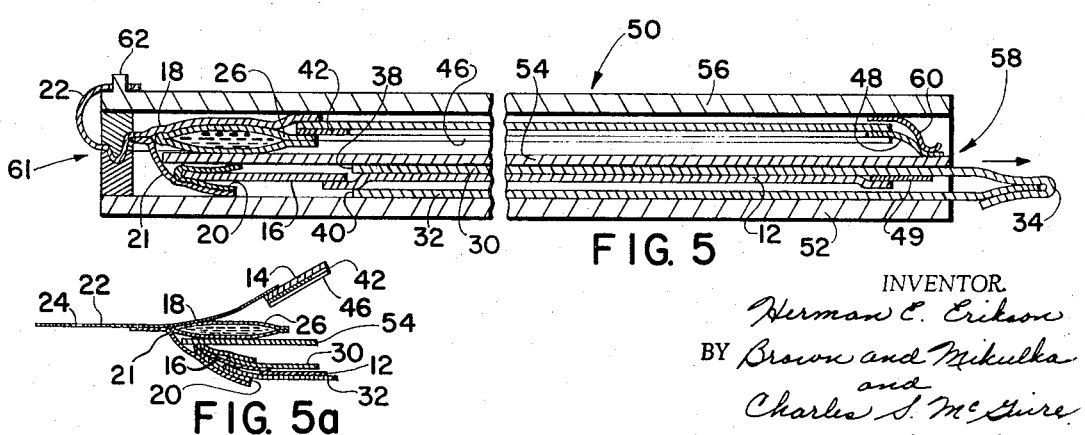
FIG. 5
FIG. 5a
INVENTOR.
Herman E. Erikson
BY Brown and Mikulka
and
Charles S. McGuire
ATTORNEYS

United States Patent Office 3,357,331
Patented Dec. 12, 1967

3,357,331
PHOTOGRAPHIC FILM ASSEMBLY
Herman E. Erikson, Winchester, Mass., assignor to Polaroid Corporation, Cambridge, Mass., a corporation of Delaware
Filed July 12, 1965, Ser. No. 471,364
12 Claims. (Cl. 95—13)

This invention relates to photographic film assemblies of the self-developing type and, more specifically, to a unitary film packet to be loaded in appropriate film holding means, such as a cassette, for exposure and to be processed by spreading a liquid processing agent between a pair of liquid confining layers of the assembly.

The film unit or assembly of the present invention is related to the type of film assembly shown in U.S. Patent 2,740,714 of A. J. Bachelder et al. and to the film assemblies designated as Types 3000 X, TLX, and others, Radiographic Packets commercially manufactured and sold by Polaroid Corporation of Cambridge, Mass. Such film assemblies, including those of the present invention as well as the above-mentioned prior art assemblies, are intended primarily for use in making X-ray exposures in a relatively large format, such as the usual 10 x 12 inch picture size. It is to be understood, however, that the invention is not to be limited by the manner of employment of the assembly or the particular format used since such assemblies are equally suited for employment in a number of other photographic applications.

Basically, film assemblies of the type with which the present invention is concerned include a first sheet having a photosensitive layer associated therewith, a second sheet which may be superposed with the first sheet and preferably includes means for receiving a positive transfer image from said photosensitive layer, and a container releasably carrying a liquid processing agent to be spread between the two sheets for developing a latent image in the photosensitive layer and assistang in the formation of said positive transfer image. In order to make such film assemblies practical for use in conventional radiographic applications, other elements are included, e.g., lighttight envelopes to protect the photosensitive layer from visible light until the assembly is loaded in a cassette, leader elements to assist in handling or removing the assembly from the cassette, etc.

The present invention has as a principal object the provision of a photographic film assembly of the general type described above having an improved relationship of elements to increase economy and facility of manufacture and to simplify handling.

A further object of the invention is to provide a unitary film packet including a pair of superposable sheets, one of which includes a photosensitive portion protected by removable envelope means, and leader means located entirely outside said envelope for positioning the packet relative to cassette prior to removal of any portion of the envelope means.

Another object is to provide an improved film assembly for exposure in a cassette and having a pair of hingedly attached sheets, one of which is enclosed in a lighttight envelope, wherein the arrangement is such as to facilitate removal of the envelope after the assembly has been positioned in the cassette.

Other objects of the invention will in part be obvious and will in part appear hereinafter.

The invention accordingly comprises the product possessing the features, properties and the relation of components which are examplified in the following detailed disclosure, and the scope of the application of which is indicated in the claims.

For a fuller understanding of the nature and objects of the invention, reference should be had to the following detailed description taken in connection with the accompanying drawings wherein:

FIG. 4 is a perspective view, with portions broken away, of a modified embodiment of the film assembly showing the latter being loaded into a suitable cassette wherein the photosensitive element may be exposed;

FIG. 5 is a fragmentary side sectional view of the cassette of FIG. 4 having the film assembly fully loaded therein and the envelope partially removed; and FIG. 5a is a fragmentary, sectional view of one end of the assembly of FIG. 5 showing the layers spread apart.

Figure 1:
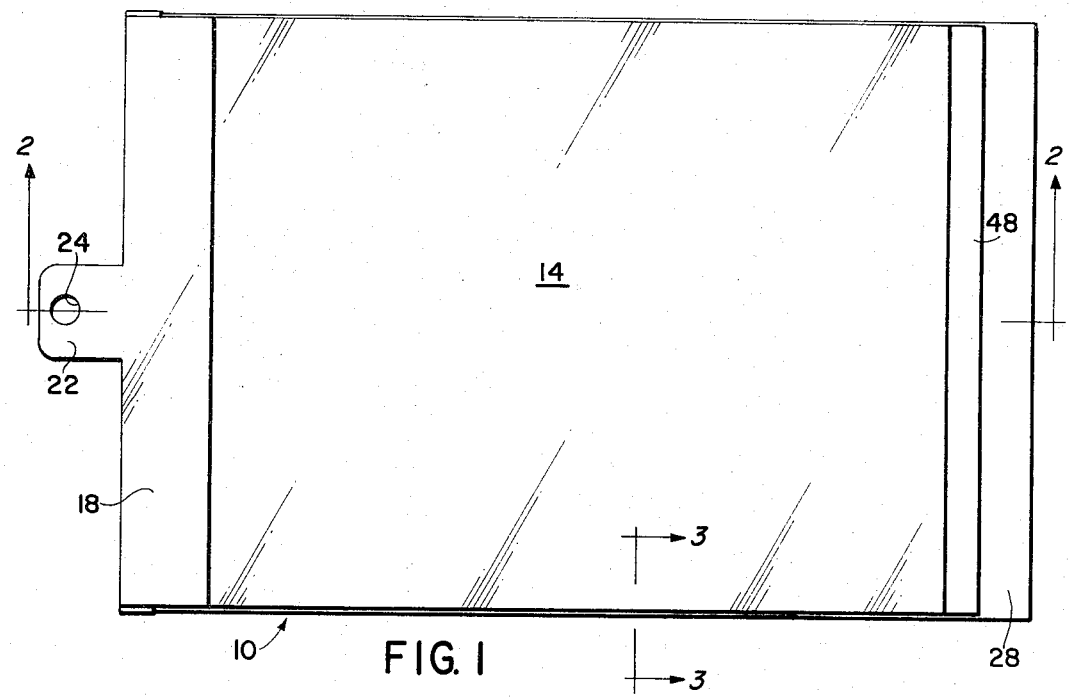
FIGURE 1 is a plan view of one embodiment of the film assembly of the invention showing the envelope enclosing the photosensitive element uppermost.
Figure 2:
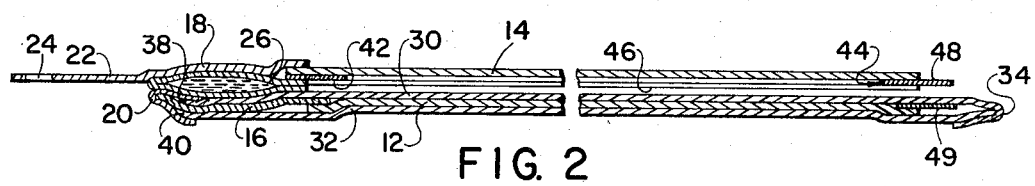
FIG. 2 is a fragmentary side view in section on the line 2—2 of FIGURE 1.
Figure 3:
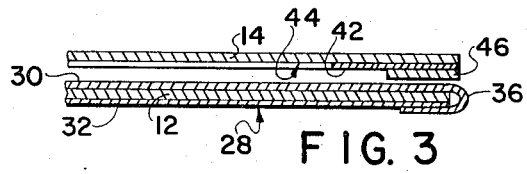
FIG. 3 is a fragmentary end view in section on the line 3—3 of FIGURE 1.

Referring now to the drawings, there is illustrated in FIGS. 1–3 a preferred embodiment of a photographic film assembly of the self-developing type, designated generally by the reference numeral 10. Film assembly 10 includes a pair of liquid confining layers 12 and 14 which are hingedly attached in such a way that the layers may be arranged in superposed relation or may be spread apart with respect to one another. Layer 12 includes a photosensitive area over at least a portion of the surface thereof which faces layer 14 when the two are superpose. A preferred material for carrying out a photographic transfer process, as well as a material which is ideally suited for X-ray photography, comprises a conventional base of flexible material such as paper, plastic, or the like coated with a silver halide emulsion.

Liquid-confining layer 14 includes a print-receiving area on the surface thereof which faces the photosensitive area of layer 12, whereby layer 14 is adapted to have formed therein a positive image by means of the well-known diffusion transfer process. A conventional, photographically insensitive paper such as baryta paper is an example of a material from which layer 14 may be formed. Thus, the layers 12 and 14 may be said to constitute, respectively, photographic negative and positive or print-receiving elements for a transfer image.

Figure 2A:
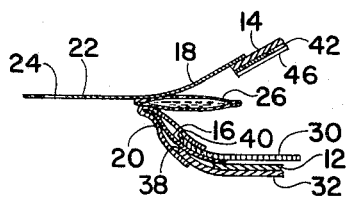
FIG. 2a is a fragmentary, sectional view of one end of the assembly of FIG. 2 shown with the layers spread apart.

Means for hinging layers 12 and 14 together include leader members 16 and 18, attached along substantially the entire width of layers 12 and 14 respectively. Cover strip 20 may be conveniently formed by folding a single sheet of suitable material longitudinally to form a V and arranged with the open end thereof facing leader 16 and layer 12. As will appear later, cover strip 20 is provided to form a covering or capping member arranged over the open end of an envelope and is therefore referred to hereinafter as an end cap. Leader 16 is attached to an interior surface of one or both of the walls formed by folding end cap 20 near the folded edge. Leader 18 is attached to the outside of end cap 20 either directly, as shown in FIG. 2a, or by means of a separate adhesive strip 21 as shown in FIG. 5a. A central portion of leader 18 is extended to form tab 22, having opening 24 therein, for a purpose which will be explained later.

Rupturable container 26, holding a liquid photographic processing composition, is mounted between layers 12 and 14, at the hinged end thereof, by being attached to leader 18 near the connection thereof to end cap 20, or by being sealed to both leader 18 and an exterior surface of end cap 20, between the two. The attachments thus far mentioned, i.e., those of layers 12 and 14 to leaders 16 and 18, of the leaders to end cap 20, and of container 26 to leader 18, may be effected by any suitable adhesive means, either heat or pressure sensitive, or by the use of additional adhesive strips (not shown) in conventional fashion. For example, end cap 20 may be provided with a conventional heat seal coating on both surfaces thereof, whereby the application of heat and pressure will effect the mutual connections of end cap 20, leaders 16 and 18, and container 26. Container 26 is formed of a substantially liquid and oxygen-impervious material and has marginal portions of the walls thereof releasably sealed together, whereby pressure applied to opposite sides of the container will force the liquid to rupture the seal along the edge farthest from the hinge means for layers 12 and 14. The liquid will thereby be discharged for spreading between the layers. Container 26 is sufficiently long that the liquid discharge thereof will extend across the photosensitive and image-receiving areas of layers 12 and 14, respectively, which preferably constitute substantially the entire opposing surfaces of said layers except for a bordering area which is masked off, as will be explained later. When carrying out a transfer process, the liquid within the container preferably comprises a viscous solution of a thickening agent, a silver halide developer and a silver halide fixer. However, such materials as the developer and fixer may be incorporated in some layer or layers of the film assembly, in which case the container need hold only a solvent for these materials. Also, while in general a thickening agent is preferred, the invention may be practiced without the use of such. In any event, the film assembly is adapted to contain processing material which is rendered effective to process an image upon rupture of the container and discharge of its liquid content, this processing material including a photographic reagent in an amount sufficient to process said image.

So that film assembly 10 may be conveniently handled, stored, loaded in a cassette, etc., means are provided for protecting the photosensitive portion of layer 12 from visible and near-visible light while still allowing relative movement of layers 12 and 14 about the hinged connection. Envelope 28, having walls 30 and 32, is made from a flexible, opaque material such as paper film leader stock. By one practice, envelope 28 may be made from a single blank of appropriate material cut so that walls 30 and 32 are in side-by-side relation. The blank is then folded together placing the walls in the superposed relation shown in FIG. 2, and appropriate flaps folded over at one end 34 (FIG. 2) and one side edge 36 (FIG. 3). The flaps are then sealed to form an envelope structure closed on three sides and open at the top, i.e., the end formed by edge 38 of wall 30 and edge 40 of wall 32. The sealing may be accomplished, for purposes of the invention, by heat and/or pressure-activated coatings applied to appropriate portions of the envelope material.

The dimensions of envelope 28 are so related to those of layer 12 that the envelope is only slightly wider than the said layer, but is significantly longer than the photosensitive portion thereof. In FIG. 3, for example, it may be seen that the side edge of layer 12 comes very close to the internal, corresponding, side edge of envelope 28; in FIG. 2 end 34 of envelope 28 is shown as extending somewhat beyond the end of layer 12, thus providing an empty space along this end of the envelope. Also, the open side of the envelope extends beyond the leading edge of the photosensitive portion of layer 12 so that leader 16 extends out of the open side of the envelope. Furthermore, the dimensions and relative positioning of envelope 28 and end cap 20 are such that edges 38 and 40 (i.e., the open side of the envelope) lie between the two walls formed by folding upon itself the strip which forms the end cap. The end cap thus forms a cover means over the open side of the envelope, thereby preventing the entry of visible and near-visible light into the envelope and protecting the photosensitive material from exposure or fogging by such light, both the envelope and end cap being made of opaque materials.

Film assembly 10, after removal of envelope 28 and exposure of the photosensitive area of layer 12, in a manner explained more fully hereinafter, is intended to be processed by drawing the assembly through a pair of pressure-applying members such as spreading rolls (not shown) which apply to the opposite sides of the assembly a compressive force sufficient to rupture container 26 and spread the contents thereof in a uniformly thin layer between layers 12 and 14. The spread rolls comprise a portion of processing apparatus such as that shown, for example, in U.S. Patent 2,638,128, and of course form no part of the present invention. In processing, the film assembly is fed between the spread rolls from its hinged end, which is thus termed the leading edge or portion of the assembly and the individual components thereof, the portions which are last to be fed between the rolls being termed trailing portions.

In carrying out a transfer process, image-forming complexes are transferred from the photosensitive material to the print-carrying element. Mask 42, formed of thin tissue paper such as condenser paper, is adhered by the use of a strippable adhesive to layer 14 and is employed to assist in confining the deposition of these image-forming complexes to a predetermined location or picture area on the layer 14. As shown, mask 42 forms a rectangular aperture, indicated generally by the reference numeral 44, which defines the picture area for the transfer image. Mask 42 may be cut in one piece from condenser paper of appropriate size, or may be made up of a plurality of pieces, as for example four or more individual strips cut to appropriate sizes and arranged to form an opening of the desired picture area, shape and size. When layers 12 and 14 are separated, after processing of the film assembly, mask 42 is adapted to be stripped from layer 14, to which it was previously adhered.

A pair of spacer strips 46, formed, for example, of suitable paper or paperboard, are secured by an adhesive to the outer surface of mask 42. Each strip 46 has a length substantially equal to that of the desired picture area and extends lengthwise of the mask adjacent the longitudinal edges thereof, between said edges and mask aperture 44. These spacer strips assist in controlling the spreading of the liquid processing agent, both by controlling the thickness of the spread between layers 12 and 14, and by confining the liquid to a surface area lying within the spacers. Spacers 46 will of course be removed with mask 42 when the latter is stripped from layer 14. While mask 42 and spacer strips 46 are preferably mounted upon print-receiving layer 14 to provide a composite structure, it is to be noted that they are not essential to the formation of a transfer image.

In most film assemblies of the self-developing type wherein a liquid processing agent is spread between two liquid-confining layers, the rupturable container is filled with more liquid composition than is needed to process the image area thereof. In order to prevent the excess liquid from being forced outside the film assembly onto the spread rolls or other portions of the processing apparatus, means are preferably provided to effect separation of the spread rolls to trap the liquid, i.e., allow it to collect in a relatively thick layer, near the trailing end of the assembly. Trapping by roll separation may be effected by mounting at least one of the rolls for movement of the axis of rotation thereof toward and away from the other roll, and providing means associated with either the film assembly or the processing apparatus to cause such movement when the trailing end of the film assembly passes through the spread rolls. Such means in either of the above-mentioned forms are well known in the prior art, having been in widespread commercial use for many years. Although film assembly 10 is preferably processed with the aid of such means, the particular form thereof is immaterial and the use of such means forms no part of the present invention.

It will be noted that mask 42 is provided with trailing portion 48, extending past the trailing edge of layer 14 and across the entire width thereof. Negative layer 12 is likewise provided with trailer strip 49, attached along the trailing edge thereof by, for example, using the photosensitive emulsion coating of layer 12 as a heat-sensitive adhesive. The excess fluid from container 26 may thus be trapped between portion 48 of mask 42 and trailer strip 49 associated with layer 12 by effecting separation of the spread rolls when film assembly 10 has been advanced to the end of layers 12 and 14, i.e., the end of the areas to be processed. Of course, trailer strip 49 may be eliminated by merely lengthening layer 12 to include a portion for trapping the excess fluid. However, the addition of a separate trailer strip to layer 12 may result in additional manufacturing economy since the cost of attaching the separate strip is more than offset by the difference in cost between the relatively expensive photosensitive sheet and the cheaper materials which may be used to form the additional strip.

Referring now to FIG. 4, film unit 10 is shown being loaded into an appropriate cassette, designated generally by the reference numeral 50, formed basically of three sections, base 52, panel 54 supporting a conventional intensifying screen (not shown), and cover 56. Each of the three sections of cassette 50 are adapted to be arranged in superposed relation and are pivotally movable relative to one another about suitable hinged connections through a mutual edge of each, providing hinged end 58 of cassette 50. Examples of further constructional details of cassettes intended primarily for utilizing film assemblies such as that of the present invention in X-ray radiography applications may be found in U.S. Patents Nos. 2,726,337, Stava et al., and 2,709,223, Bachelder et al. A film holder or cassette wherein film assembly 10 may be utilized for photographic applications with visible and near-visible light may be found in U.S. Patent No. 3,103,864, Erikson et al.

As seen in FIG. 4, film assembly 10 is positioned in cassette 50 by separating the three sections of the cassette and placing print-receiving layer 14 on one side of panel 54 and photosensitive layer 12, within envelope 28, on the other side. The photosensitive surface of layer 12 faces the surface of panel 54 which carries the intensifying screen. A gap is provided between base 52 and panel 54 at hinged end 58 of cassette 50 so that closed end 34 of envelope 28 may extend therethrough, whereby a portion of the envelope will be outside of the cassette when the latter is closed by moving the three sections thereof about their mutual hinged connections into superposition. Cassette 50 is provided with light seal means including resilient boundary portions such as that shown in FIG. 5 between panel 54 and cover 56 at hinged end 58, comprising spring member 60, mounted on cover 56, extending across the hinged end of the cassette and urged toward engagement with panel 54. Spring member 60 is covered with an opaque material such as black felt and is so arranged that an effective light barrier is provided thereby to prevent the entry of light between cover 56 and panel 54 when cassette 50 is in the closed position. A similar spring member (not shown) may be provided to extend across hinged end 58 to effect a light seal between base 52 and panel 54 when the cassette is closed. The unhinged end and sides of the cassette are also provided with means for maintaining the interior of the cassette in a lighttight condition when closed. The last-mentioned light sealing means may comprise mating portions of base 52 and cover 56, such as that indicated at 61 in FIG. 5.

After film assembly 10 has been loaded into cassette 50 and the latter moved to the closed position, as explained above, envelope 28 may be withdrawn from its covering relationship to negative layer 12 since the photosensitive portion is now protected from visible light by the cassette. Due to the arrangement of the respective sections of the cassete and light seal means at hinged end 58, end portion 34 of envelope 28 extends between base 52 and panel 54 at hinged end 58. The trailing edge of negative layer 12, or trailer strip 49 thereof, remains within cassette 50, as does the end of trailing portion 48 of mask 42; the trailing portions of both layers 12 and 14 may be engaged between the light seal means and panel 54 at the end of the cassette, but need not necessarily be so.

The closure means (not shown) provided for retaining cassette 50 in the closed position are so constructed and arranged as to allow slidable movement of envelope 28 with respect to the cassette while still maintaining the latter in lighttight condition. According to a preferred embodiment, disclosed, for example, in previously mentioned U.S. Patent No. 2,726,337, the closure means permit the cassette to be latched in a first closed position wherein the three sections are retained in rather loose engagement, permitting the aforementioned sliding movement of envelope 28 while still maintaining the cassette in a lighttight condition. The closure means are further adapted to retain the cassette in a second closed position, wherein the layers of film assembly 10 are held in close engagement between the sections of the cassette; more particularly, negative layer 12 is urged toward close and continuous engagement of the photosensitive surface thereof with the intensifying screen carried by panel 54.

After film assembly 10 has been loaded in cassette 50 and the latter moved to the first closed position described above, tab 22 is bent back over the edge of cover 56 and placed with pin 62, provided on the outer surface of the cover, extending through opening 24 in the tab. This insures proper final positioning of the film assembly within the cassette, but is not essential since positioning the hinged end of the assembly over the free edge of panel 54 is sufficient for most purposes. The portion of envelope 28 which extends past hinged end 58 of cassette 50 may then be grasped manually by the operator and pulled outwardly, in the direction indicated by the arrow in FIG. 5. Since envelope 28 is not attached to any other portion of film assembly 10, it may be easily withdrawn while the cassette is in the first closed position. It will be noted in FIG. 2 for example, that envelope 28 extends somewhat beyond the end of trailer strip 49, thereby insuring that only the envelope and not the contents thereof, will be grasped and pulled by the operator. As previously mentioned, the light seal means provided around the boundary of the cassette maintains the interior thereof in light-tight condition during withdrawal of envelope 28. Upon movement of the cassette from the first to the second closed position, the unit is ready for exposure.

After exposure in any conventional manner the film assembly is processed by withdrawal from the cassette and passage through processing apparatus such as the previously-mentioned spread rolls. Light shielding means, normally associated with the processing apparatus, provide a path for transfer of the film unit from the cassette, through the spread rolls, and into a processing chamber. A convenient method for withdrawing the film assembly from the cassette is to release the closure means, by which the assembly is engaged between the sections of the cassette, and place tab 22 for engagement between the rotatable spread rolls. The film assembly will then be advanced through the processing apparatus as it is also removed from the cassette in response to rotation of the rolls between which the assembly is engaged.

The structure of the film assembly described above provides a number of marked advantages over previously known assemblies of the same general type. For example, in the prior assemblies the light shielding means or end cap at the hinged end of the assembly extended around both the positive and negative layers and was attached to both layers or elements associated therewith. This necessitated tearing off or opening a portion of the assembly after it had been placed in the cassette before the envelope could be removed. Also, with the light barrier or end cap passed completely around the hinged end of the assembly, the tab had to be folded and covered by the end cap until the latter was opened or removed. Besides the additional operations required in loading the assembly in the cassette and removing the envelope, the folding of the tab was also undesirable for a number of reasons, e.g., the additional thickness of the film assembly in the area of the fluid container, due to the folded tab, increases the pressure and thus the danger of premature rupture of the container; there is a possibility of malfunction if the folding operation is not properly performed; and, the creases in the tab resulting from the fold make it more difficult to direct the tab from the cassette into the bite of the spread rolls. These problems are obviously avoided by providing the tab on the outside of the assembly, which also affords use of the tab as a convenient means for handling the film assembly when taking it from a carton or stack of other assemblies.

It is to be further noted that the construction of the present invention lends itself well to the manufacture of the positive and negative layers as separate portions of the assembly with the joining together at the hinged end performed as the last step in the operation. This permits many operations in the fabrication of the assemblies, including the final joining of the two layers mentioned above, to be performed under lighted conditions. Also, the two layers may be separated without damage after being joined together, whereby a defective positive layer may be removed and replaced with a new positive without damage to the negative layer, and vice versa. Additional economies in the mass production of such film assemblies may be realized from such interchangeability of portions of the product, which has been impractical with prior assemblies of this type. Still another advantage is the fact that the positive and negative layers may be separated while the negative is exposed, if desired, and later united for processing in the aforedescribed manner. For example, the negative could be loaded into a cassette such as that shown in FIG. 4, or others, and exposed without being attached to the positive layer. In such a case the end cap could be utilized for indexing the negative in the holder and the negative layer could also have associated therewith a tab, corresponding in size and position to tab 22 of the positive layer. The tabs on the two layers could then be superposed, aligned and fed into the spread rolls together so that the opposing surfaces of the positive and negative layers are in proper registration. When the positive and negative are to be separated at any time during use, it is desirable to provide means readily indicating to the operator that compatible positive and negative layers are being placed together. Such means may comprise, for example, color coding of the tabs or other portions of the positive and negative layers.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assembly comprising, in combination:
  (a) a first liquid-confining layer having a photosensitive portion on one surface thereof;
  (b) a second liquid-confining layer positionable in superposed relation to said first layer and facing said one surface thereof;
  (c) hinge means connecting said first and second layers together at one end thereof for movement into and away from said superposed relation;
  (d) a rupturable container holding a liquid processing composition and positioned between said layers adjacent said hinge means for discharge of its liquid contents for distribution between said sheets;
  (e) an envelope enclosing at least a portion of said first layer, said envelope being closed on three sides and open along the side thereof parallel to said hinge means; and
  (f) cover means including a pair of wall members at least as long as said open side of said envelope and extending from an anchored position substantially at said hinge means to enclose the entire open side of said envelope between said wall members;
  (g) said envelope and said cover means being opaque to visible and near-visible light, whereby said photosensitive portion is protected from such light by the cooperative arrangement of said envelope and said cover means.

2. The invention according to claim 1 wherein said wall members are attached to one another along an edge parallel to said open side of said envelope and extend from the attached edge to free edges, thereby forming a V with said free edges extending over said open side.

3. The invention according to claim 2 herein said first layer is attached to at least one of said wall members between the two and along an edge of said first layer which extends out of said open side of said envelope.

4. A photographic film assembly comprising, in combination:
  (a) a first flexible sheet having a photosensitive area on one surface thereof;
  (b) a second flexible sheet having an area on one surface thereof adapted to receive by transfer a positive print of an image formed in said photosensitive area of said first sheet;
  (c) first leader means attached along a leading edge of said first sheet to form an extension thereof;
  (d) second leader means attached along a leading edge of said second sheet to form an extension thereof;
  (e) a rupturable container holding a liquid processing composition and positioned between said first and second leader means for discharge of its liquid contents for distribution between said first and second sheets;
  (f) an envelope enclosing said first sheet, said envelope having three closed sides and one open side, said first leader means extending through said one open side;
  (g) cover means including a pair of flexible wall members attached along one edge of each and extending therefrom in superposed relation to free edges, substantially parallel to one another and to said attached edges;
  (h) means for attaching said first leader means to at least one of said wall members between the two and along an edge of said first leader means which extends outside said envelope;
  (i) said cover means being at least as long as said open side of said envelope and enclosing said open side between said wall members; and
  (j) a hinged connection between said cover means and said second leader means, whereby said first and second sheets may be moved into superposition and away from one another about said hinged connection;
  (k) said envelope and said cover means being opaque to visible and near-visible light, whereby said photosensitive portion is protected from such light by the cooperative arrangement of said envelope and said cover means.

5. The invention according to claim 4 wherein said cover means comprises a single flexible sheet folded upon itself and having a length, along the folded edge, substantially greater than the width from the folded to the free edges.

6. The invention according to claim 5 wherein the closed side of said envelope opposite and parallel to said open side extends beyond the corresponding edge of said first sheet, thereby providing an empty portion along the end of said envelope.

7. The invention according to claim 6 wherein said first and second sheets and said first and second leader means are all of substantially the same width and said envelope is only slightly wider.

8. The invention according to claim 7 wherein said first leader means is attached on opposite sides thereof to each of said wall members, between the two and adjacent said folded edge.

9. In a self-developing photographic film assembly including a photosensitive sheet, a print-receiving sheet positionable in superposed relation to said photosensitive sheet and adapted to receive therefrom a positive, transfer-reversal point, and a rupturable container holding a liquid processing composition and adapted to release the same for spreading between said sheets to effect processing thereof, the combination comprising:

(a) a first flexible leader sheet having a width substantially equal to that of said photosensitive sheet and attached thereto along overlapping edge portions of each;

(b) a second flexible leader sheet having a width substantially equal to that of said print-receiving sheet and attached thereto along overlapping edge portions of each;

(c) an envelope having a pair of superposed, rectangular walls, closed along three sides and open along one side and having a width along said open side only slightly greater than the width of said photosensitive sheet and a length substantially greater than that of said photosensitive sheet;

(d) said envelope being arranged to entirely enclose said photosensitive sheet with said first leader sheet extending through said open side;

(e) a flexible cover strip folded upon itself to form a pair of superposed strips extending from a folded edge, having a length at least equal to that of said open side of said envelope, to a pair of free edges parallel with one another and with said folded edge;

(f) means attaching said first leader sheet, along an edge thereof parallel to said overlapping edge, to said cover strip between said superposed strips and adjacent said folded edge;

(g) said envelope and said cover strip being opaque to visible and near-visible light and so arranged that said open side of said envelope lies entirely between said superposed strips of said cover means, thereby protecting said photosensitive sheet from said light; and (h) connecting means for mutually attaching said cover strip and said second leader means for relative pivotal movement about a line parallel to said folded edge, whereby said photosensitive and said print-receiving sheets may be superposed with one another and may be moved apart about said pivotal connection.

10. The invention according to claim 9 wherein said second leader sheet includes a portion extending forwardly of an edge thereof parallel to said overlapping edge, said portion having a width substantially less than that of said second leader sheet and centrally disposed with respect to the edge from which it extends.

11. The invention according to claim 9 wherein said connecting means comprises a flexible strip attached to both said cover strip and said second leader sheet.

12. The invention according to claim 9 wherein said connecting means comprises adhesive means securing said cover strip and said second leader sheet to opposite sides of said rupturable container along a marginal edge portion thereof so that said container lies between said first and second leader sheets.

No references cited.

JOHN M. HORAN, *Primary Examiner.*